US011550808B2

(12) United States Patent
Devarao et al.

(10) Patent No.: US 11,550,808 B2
(45) Date of Patent: Jan. 10, 2023

(54) PREDICTING STORAGE REQUIREMENTS OF A DATABASE MANAGEMENT SYSTEM BASED ON APPLICATION BEHAVIOR AND BEHAVIOR OF DATABASE QUERIES

(71) Applicant: International Business Machines Corporation, Armonk, NY (US)

(72) Inventors: Praveen Devarao, Karnataka (IN); Alok Mitra, Chandauli (IN); Smitha Pambalath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1013 days.

(21) Appl. No.: 15/825,887

(22) Filed: Nov. 29, 2017

(65) Prior Publication Data
US 2019/0163759 A1 May 30, 2019

(51) Int. Cl.
*G06F 16/25* (2019.01)
*G06F 11/30* (2006.01)
(Continued)

(52) U.S. Cl.
CPC ........ *G06F 16/252* (2019.01); *G06F 11/3034* (2013.01); *G06F 11/3442* (2013.01);
(Continued)

(58) Field of Classification Search
CPC .................................................. G06F 11/3447
See application file for complete search history.

(56) References Cited

U.S. PATENT DOCUMENTS

| 8,010,337 B2* | 8/2011 | Narayanan .......... G06F 11/3419 703/22 |
| 9,372,637 B1* | 6/2016 | Alatorre ................ G06F 16/283 |
| 2011/0288847 A1 | 11/2011 | Narayanan et al. |

FOREIGN PATENT DOCUMENTS

WO    2016177941 A1    11/2016

OTHER PUBLICATIONS

Wikipedia, "Toad," https://en.wikipedia.org/wiki/Toad_(software), 2017, pp. 1-3.

(Continued)

*Primary Examiner* — Mark D Featherstone
*Assistant Examiner* — Ranjit P Doraiswamy
(74) *Attorney, Agent, or Firm* — Robert A. Voigt, Jr.; Shackelford, Bowen, McKinley & Norton, LLP

(57) ABSTRACT

A method, system and computer program product for forecasting a storage requirement of a database management system (DBMS). The storage-related operations (e.g., create, delete, update) of the applications connected to the DBMS are monitored. The impact on the storage usage of the DBMS based on these storage-related operations performed by the applications is monitored. Furthermore, the applications are categorized into groups of applications based on the monitored storage-related operations. A mathematical model is then built to forecast the storage requirement of the DBMS based on the monitored impact on the storage usage of the DBMS by the monitored storage-related operations of the applications and the categorization of the applications. The storage requirement of the DBMS is then forecasted based on the built mathematical model. In this manner, the storage requirements of the DBMS may be accurately predicted to ensure that there is available storage thereby preventing performance degradation.

20 Claims, 4 Drawing Sheets

(51) Int. Cl.
    *G06F 11/34*     (2006.01)
    *G06F 16/21*     (2019.01)

(52) U.S. Cl.
    CPC ........ *G06F 11/3447* (2013.01); *G06F 16/211* (2019.01); *G06F 2201/80* (2013.01)

(56) References Cited

OTHER PUBLICATIONS

Raza et al., "Self-Prediction of Performance Metrics for the Database Management System Workload," International Journal of Computer Theory and Engineering, vol. 4, No. 2, Apr. 2012, pp. 198-201.

Narayanan et al., "Continuous Resource Monitoring for Self-Predicting DBMS," 13th IEEE International Symposium on Modeling, Analysis, and Simulation of Computer and Telecommunication Systems, Sep. 27-29, 2005, pp. 1-12.

Martin et al., "Workload Models for Autonomic Database Management Systems," 2006 International Conference on Autonomic and Autonomous Systems, Jul. 19-21, 2006, pp. 1-6.

\* cited by examiner

PREDICTING STORAGE REQUIREMENTS OF A DATABASE MANAGEMENT SYSTEM BASED ON APPLICATION BEHAVIOR AND BEHAVIOR OF DATABASE QUERIES

TECHNICAL FIELD

The present invention relates generally to database management systems, and more particularly to predicting storage requirements of a database management system based on application behavior and behavior of database queries.

BACKGROUND

A database management system (DBMS) maintains and manages the data stored in databases. Management includes storing, deleting, retrieving and updating the data. Typically, data stored in a database includes plain values (e.g., numbers and alphanumeric strings) and complex objects, such as images, documents and spatial data. The DBMS typically is hosted by a server, which may be referred to as a "database server," that is accessible by a plurality of client systems (or simply referred to as "clients") via a network.

Currently, there is an inordinate amount of data to be stored by the database management system, due in part, to the exponential increase of data provided from various sources. With this huge amount of data to be stored, it becomes a challenging task for the database administrator for planning the storage requirements of the database management system as the database administrator needs to take into consideration the operational impact along with the budget implications it would pose on an organization.

Accurately predicting the storage requirements of the database management system is important to ensure that there is available storage or else risk performance degradation, or at worst, failure of the database management system.

Unfortunately, there is not currently a means for accurately predicting the storage requirements of the database management system.

SUMMARY

In one embodiment of the present invention, a method for forecasting a storage requirement of a database management system comprises monitoring storage-related operations of applications connected to the database management system. The method further comprises monitoring an impact on storage usage of the database management system by the monitored storage-related operations of the applications. The method additionally comprises categorizing the applications into groups of applications based on the monitored storage-related operations, where each group of applications comprises one or more applications exhibiting similar monitored storage-related operations within a threshold degree of variance. Furthermore, the method comprises building, by a processor, a mathematical model to forecast the storage requirement of the database management system based on the monitored impact on storage usage of the database management system by the monitored storage-related operations of the applications and based on the categorization of the applications. Additionally, the method comprises forecasting, by the processor, the storage requirement of the database management system based on the mathematical model.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for forecasting a storage requirement of a database management system. In one embodiment of the present invention, the storage-related operations (e.g., create, delete, retrieve, update) of the applications connected to the database management system are monitored. The impact on the storage usage of the database management system based on these storage-related operations performed by the applications is monitored. Furthermore, the applications are categorized into groups of applications based on the monitored storage-related operations. For example, applications that perform a high percentage of create operations (implying an increase in storage usage) would be categorized in one group; whereas, applications performing a high percentage of delete operations (implying a decrease in storage usage) would be categorized in a different group. A mathematical model is then built to forecast the storage requirement of the database management system based on the monitored impact on the storage usage of the database management system by the monitored storage-related operations of the applications and the categorization of the applications. The storage requirement of the database management system is then forecasted based on the built mathematical model. In this manner, the storage requirements of the database management system may be accurately predicted to ensure that there is available storage thereby preventing performance degradation, or at worst, failure of the database management system.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
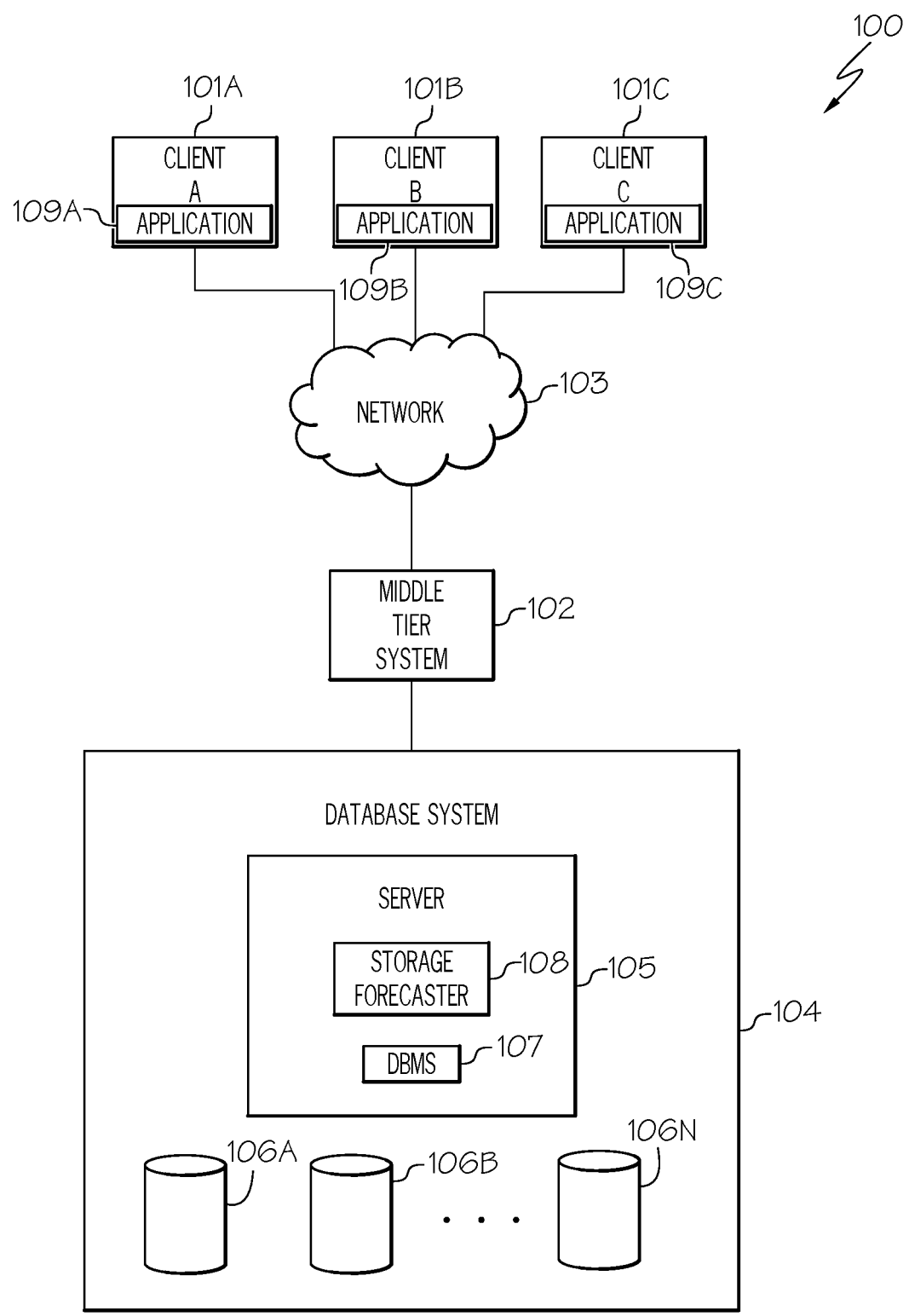
FIG. 1 illustrates a network system configured in accordance with an embodiment of the present invention.

Referring now to the Figures in detail, FIG. 1 illustrates a network system 100 configured in accordance with an embodiment of the present invention. Network system 100 includes clients 101A-101C (identified as "Client A," "Client B," and "Client C," respectively in FIG. 1) connected to a middle tier system 102 via a network 103. Clients 101 may collectively or individually be referred to as clients 101 or client 101, respectively. Client 101 may be any type of computing device (e.g., a portable computing unit, a Personal Digital Assistant (PDA), a smartphone, a laptop computer, a mobile phone, a navigation device, a game console, a desktop computer system, a workstation, an Internet appliance and the like) configured with the capability of connecting to network 103 and consequently communicating with database system 104 as discussed below.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Network system 100 further includes a database system 104 connected to middle tier system 102. While middle tier system 102 is shown to be directly connected to database system 104, middle tier system 102 may be connected to database system 104 via a network (not shown), similar to network 103. Database system 104 contains a server (or referred to as "database server") 105 holding one or more databases 106A-106N (where N can be any positive integer number). Databases 106A-106N may collectively or individually be referred to as databases 106 or database 106, respectively.

As illustrated in FIG. 1, server 105 contains a database management system 107 (identified as "DBMS" in FIG. 1) configured with the capability of maintaining and managing the data stored in databases 106.

Furthermore, as illustrated in FIG. 1, server 105 contains a software module, referred to herein as the "storage forecaster" 108. Storage forecaster 108 is configured to forecast the storage requirements of DBMS 107 as discussed further below in connection with FIGS. 3-5. A description of an embodiment of a hardware configuration of server 105 is provided below in connection with FIG. 2.

Furthermore, as shown in FIG. 1, clients 101A-101C include an application 109A-109C, respectively, to perform various storage-related operations (e.g., create, retrieve, update, delete) on the data stored in databases 106 that is managed by database management system 107. Such operations may be performed by the applications using SQL statements, such as insert (used to create data), select (used to retrieve data), update (used to update data) and delete (used to delete data). Applications 109A-109C may collectively or individually be referred to as applications 109 or application 109, respectively. While FIG. 1 illustrates each client 101 including a single application, the present invention is not to be limited in scope to such a depiction. Each client 101 may include any number of applications 109 configured to perform storage-related operations on the data stored in databases 106 that is managed by database management system 107.

In one embodiment, clients 101 generate requests for service to middle tier system 102, at least some of these requests requiring access to information in the database(s) 106 of database system 104. Middle tier system 102 acts as a server to clients 101; it may provide various services to clients 101 (not all of which necessarily involve database access), but in particular it functions as an intermediary between the clients 101 and database system 104 in handling client requests to access information in database 106. Where necessary to provide a requested service, middle tier system 102 uses the client request for information in a general form to generate one or more requests to server 105 of database system 104 in a specific form required by database 106 to be accessed. Server 105 generates responses to those requests (e.g., copies of selective information, results of queries, acknowledgments of changes made to the information, etc.), which are transmitted to middle tier system 102, and used by middle tier system 102 to provide responses to clients 101. Middle tier system 102, which handles all direct interaction with clients 101, appears to clients 101 as the server. From the perspective of database system 104, middle tier system 102 functions as a representative of multiple clients to transmit and receive information from clients 101.

FIG. 1 is intended to represent a typical environment at a high level of generality, and is not intended to represent all components of an environment in detail, or all possible permutations of an environment for accessing a database. Numerous variations of the environmental representation of FIG. 1 are possible, of which the following in particular are possible, the description of particular variations herein being intended by way of example only and not by way of limitation. For example, embodiments of the present invention discussed herein may be implemented in several environments, including a cloud environment. Furthermore, although clients 101, middle tier system 102 and database system 104 are shown as separate and distinct entities, some or all of these may in fact be combined. In another example, system 100 may include any number of clients 101, middle tier systems 102, networks 103, database systems 104, servers 105 and databases 106. For example, while a single server 105 is shown in database system 104, database system 104 may include multiple servers 105.

Figure 2:
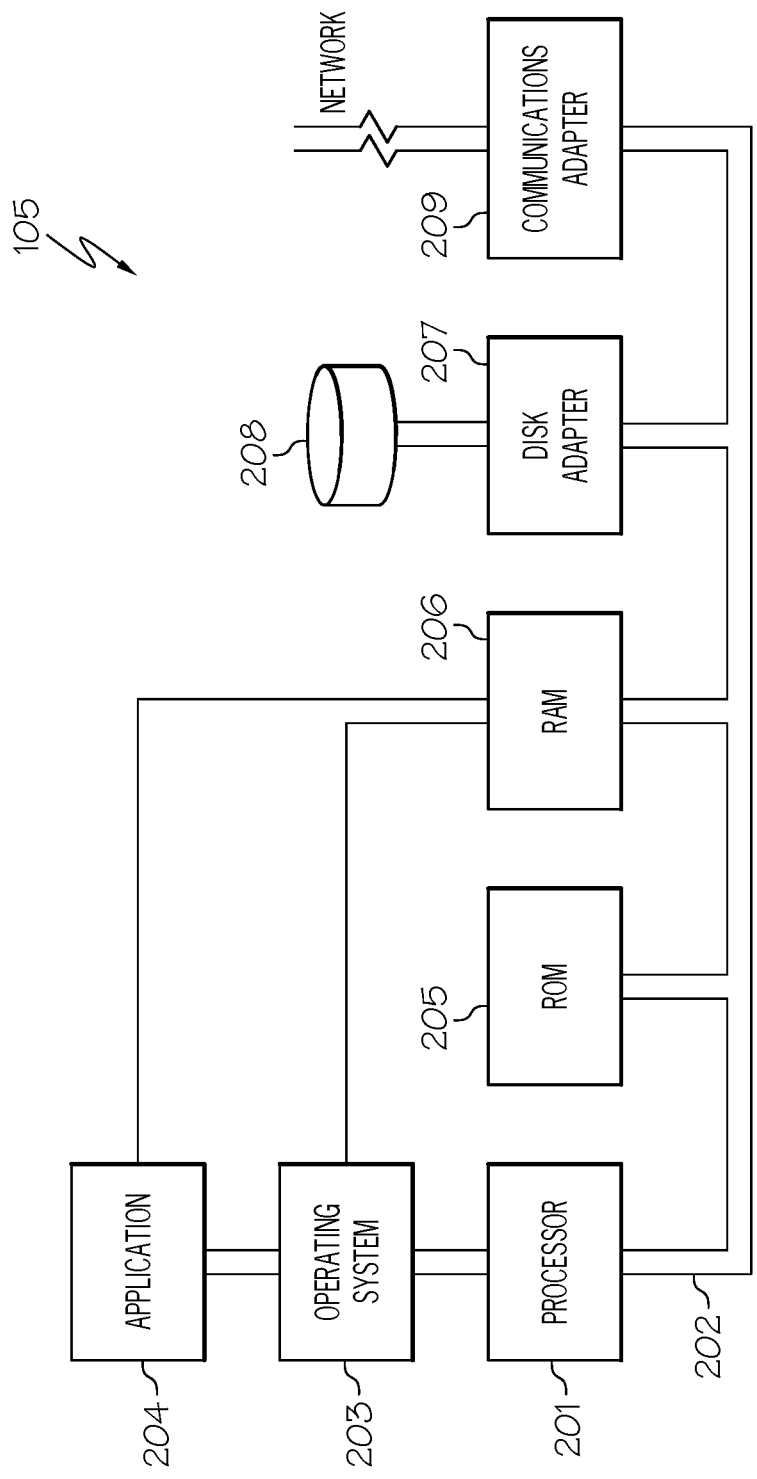
FIG. 2 illustrates an embodiment of the present invention of a hardware configuration of a server which is representative of a hardware environment for practicing the present invention.

Referring now to FIG. 2, FIG. 2 illustrates an embodiment of the present invention of a hardware configuration of server 105 (FIG. 1) which is representative of a hardware environment for practicing the present invention. Referring to FIG. 2, server 105 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, storage forecaster 108 configured to forecast the storage requirements of DBMS 107 as discussed further below in connection with FIGS. 3-5.

Referring again to FIG. 2, read-only memory ("ROM") 205 is coupled to system bus 202 and includes a basic input/output system ("BIOS") that controls certain basic functions of server 105. Random access memory ("RAM") 206 and disk adapter 207 are also coupled to system bus 202.

It should be noted that software components including operating system 203 and application 204 may be loaded into RAM 206, which may be server's 105 main memory for execution. Disk adapter 207 may be an integrated drive electronics ("IDE") adapter that communicates with a disk unit 208, e.g., disk drive. It is noted that the program for forecasting the storage requirements of DBMS 107, as discussed further below in connection with FIGS. 3-5, may reside in disk unit 208 or in application 204.

Server 105 further includes a communications adapter 209 coupled to bus 202. Communications adapter 209 interconnects bus 202 with an outside network thereby allowing server 105 to communicate with other devices, such as middle tier system 102.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, there is an inordinate amount of data to be stored by the database management system, due in part, to the exponential increase of data provided from various sources. With this huge amount of data to be stored, it becomes a challenging task for the database administrator for planning the storage requirements of the database management system as the database administrator needs to take into consideration the operational impact along with the budget implications it would pose on an organization. Accurately predicting the storage requirements of the database management system is important to ensure that there is available storage or else risk performance degradation, or at worst, failure of the database management system. Unfortunately, there is not currently a means for accurately predicting the storage requirements of the database management system.

Figure 3:
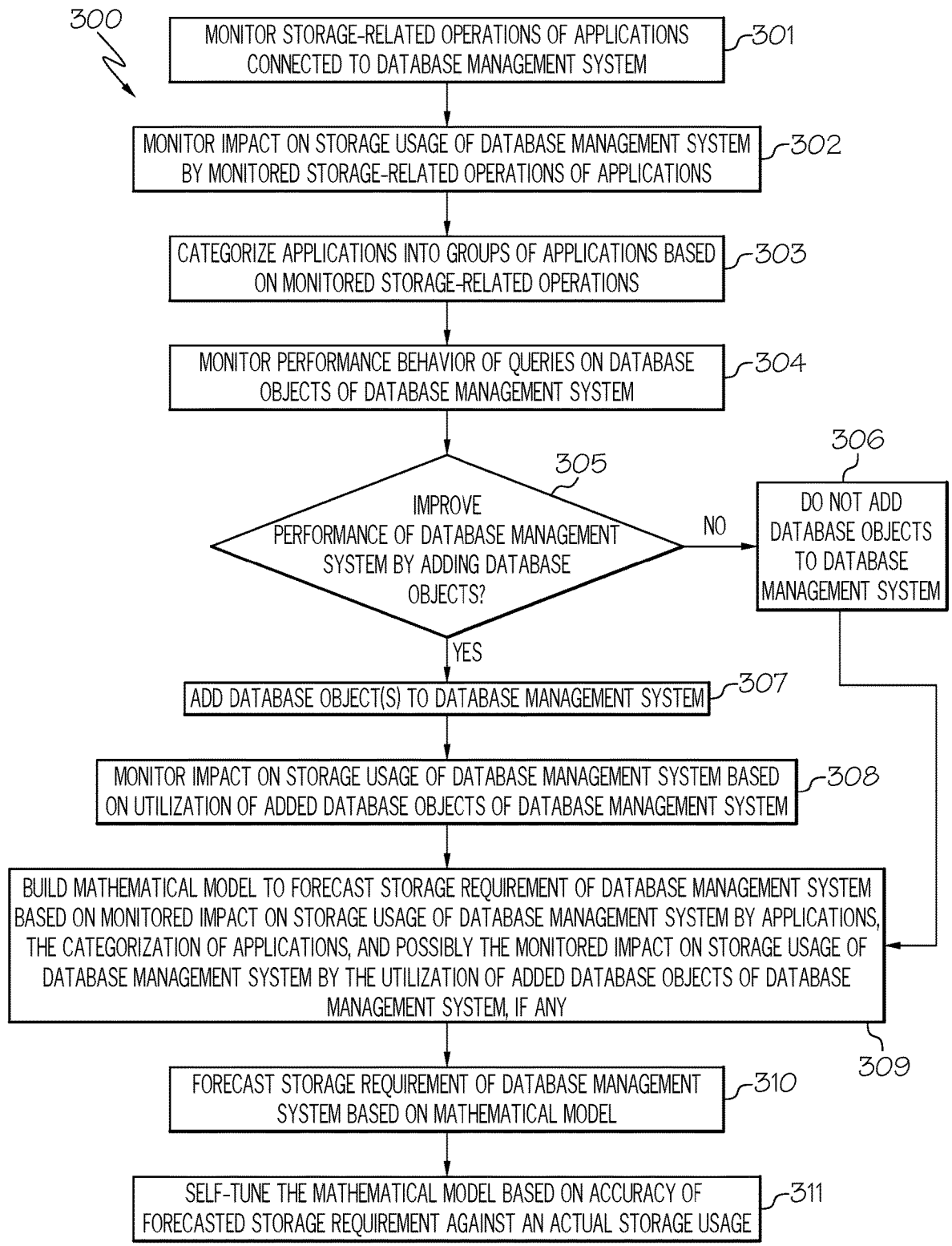
FIG. 3 is a flowchart of a method for accurately predicting the storage requirements of the database management system in accordance with an embodiment of the present invention.
Figure 4:
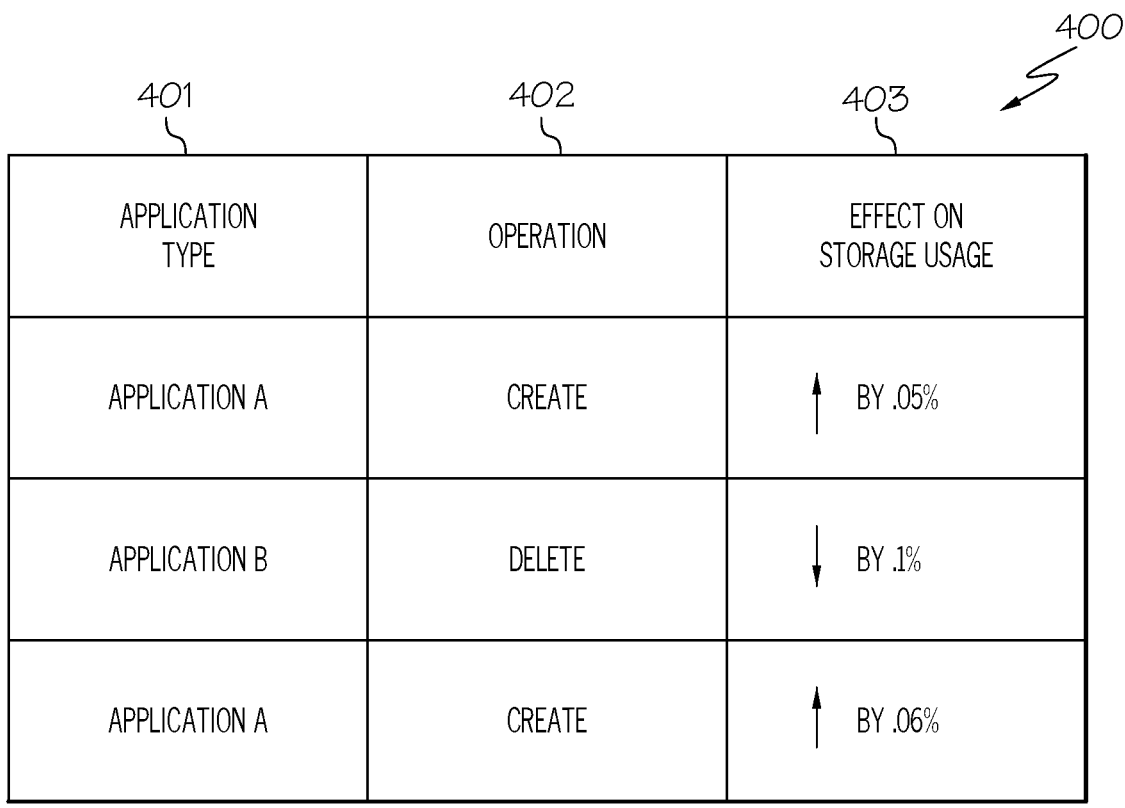
FIG. 4 is a data structure storing data regarding the monitored impact on the storage usage of the database management system by the applications in accordance with an embodiment of the present invention.
Figure 5:
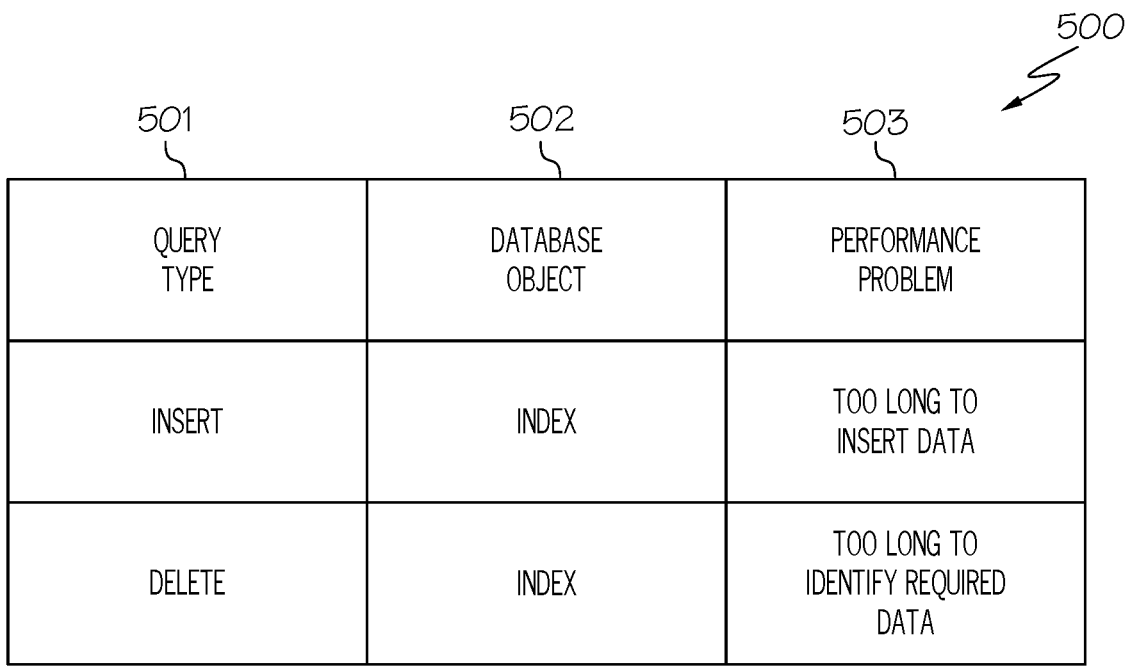
FIG. 5 is a data structure storing data regarding the monitored performance behavior of the queries on the database objects in accordance with an embodiment of the present invention.

The principles of the present invention provide a means for accurately predicting the storage requirements of the database management system as discussed below in connection with FIGS. 3-5. FIG. 3 is a flowchart of a method for accurately predicting the storage requirements of database management system 107. FIG. 4 is a data structure storing data regarding the monitored impact on the storage usage of the database management system by the applications. FIG. 5 is a data structure storing data regarding the monitored performance behavior of the queries on the database objects.

As discussed above, FIG. 3 is a flowchart of a method 300 for accurately predicting the storage requirements of database management system 107 in accordance with an embodiment of the present invention.

Referring to FIG. 3, in conjunction with FIGS. 1-2, in step 301, storage forecaster 108 monitors storage-related operations (e.g., create, delete, retrieve, update) of applications 109 connected to database management system 107. Applications, as used herein, refer to the applications 109 running on clients 101. These applications are used by the users of clients 101 to perform various storage-related operations on the data stored in databases 106 that is managed by database management system 107. Such operations may be performed by applications 109 using SQL statements, such as insert (used to create data), select (used to retrieve data), update (used to update data) and delete (used to delete data).

In step 302, storage forecaster 108 monitors the impact on the storage usage of database management system 107 by the monitored storage-related operations of applications 109. For example, applications 109 performing create operations (inserting data) on the data stored in database 106 will be increasing the storage usage of databases 106 that are managed by database management system 107. In another example, applications 109 performing delete operations (deleting data) on the data stored in database 106 will be decreasing the storage usage of databases 106 that are managed by database management system 107. In one embodiment, the monitored impact may be reflected in a data structure storing various information, such as the type of application, its storage-related operations and the effect on storage usage as shown in FIG. 4. In one embodiment, storage forecaster 108 continues to monitor the impact on the storage usage of database management system 107 by the monitored storage-related operations of applications 109, and as a result, the impact on the storage usage of database management system 107 is continuously updated.

FIG. 4 is a data structure 400 storing data regarding the monitored impact on the storage usage of database management system 107 by applications 109 in accordance with an embodiment of the present invention.

As shown in FIG. 4, data structure 400 may store the application type 401, the storage-related operation 402 and the effect on the storage usage 403. For example, application 109 that performed a storage-related operation (create operation) may correspond to an application type of application A. Its storage-related operation (create operation) as well as its effect on the storage usage (increase by 0.05%) is stored in conjunction with its application type. In such an example, by performing the create operation (insert data), there is an increase in storage usage of databases 106, such as an increase of 0.05% as shown in FIG. 4

In other examples as shown in FIG. 4, there was an application with an application type of application B that performed the delete operation which resulted in a decrease of 0.1% of storage usage. Furthermore, as shown in FIG. 4, there was an application with an application type of application A that performed the create operation which resulted in an increase of 0.06% of storage usage.

Such information may be used to build a mathematical model to forecast the storage requirement of database management system 107 as discussed further below.

Returning to FIG. 3, in conjunction with FIGS. 1-2 and 4, in step 303, storage forecaster 108 categorizes applications 109 into groups of applications 109 based on the monitored storage-related operations. In one embodiment, each group of applications includes one or more applications exhibiting similar monitored storage-related operations within a threshold degree of variance, which may be user-selected. For example, applications 109 that perform a high percentage of create operations (implying an increase in storage usage) would be categorized in one group; whereas, applications 109 performing a high percentage of delete operations (implying a decrease in storage usage) would be categorized in a different group. By categorizing applications 109, it will assist storage forecaster 108 in forecasting the storage requirement of database management system 107. For example, a higher share of applications 109 categorized in the group for performing a high percentage of create operations will reflect the forecast that a higher storage availability is required to ensure that there is available storage thereby preventing performance degradation, or at worst, failure of database management system 107.

In step 304, storage forecaster 108 monitors the performance behavior of queries on different database objects of database management system 107. A query, as used herein, refers to an inquiry into database 106 using a statement (e.g., SQL statement). A query is used to extract data from database 106 in a readable format according to the user's request. A database object, as used herein, is any defined object in database 106 that is used to store or reference data. Examples of database objects include tables, views, clusters, sequences, indexes and synonyms. Performance behavior of queries, as used herein, refers to the way or manner in which the query functions to carry out its action, task or function. For example, monitoring the performance behavior of the query for inserting data in a table involves monitoring the manner in which the query carries out its task for inserting data. Various performance issues involving queries may occur, such as taking too long to identify the required data, taking too long to store data, taking too long to retrieve the data and taking too long to delete data. Other examples of problematic performance behavior of queries include selecting more data than needed. In one embodiment, storage forecaster 108 continues to monitor the performance behavior of queries on different database objects of database management system 107, and as a result, the performance behavior of queries on different database objects of database management system 107 is continuously updated.

In one embodiment, the monitored performance behavior of the queries may be reflected in a data structure storing various information, such as the type of query, the database object and the performance problem, if any, as shown in FIG. 5.

FIG. 5 is a data structure 500 storing data regarding the monitored performance behavior of the queries on the database objects in accordance with an embodiment of the present invention.

As shown in FIG. 5, data structure 500 may store the query type 501 (the storage-related operation, such as the SQL statement), the database object 502 (the database object to which the query is directed to) and the performance problem 503, if any. For example, a query performing the create operation (insert SQL statement) on the database object of an index exhibits the performance problem of taking too long to insert data. Such a problem may be identified by comparing the total time for inserting the data with a threshold amount of time, that may be user-selected, which is based on inserting a substantially similar amount of data. In another example, a query performing the delete operation (delete SQL statement) on the database object of an index exhibits the performance problem of taking too long to identify the required data to be deleted. Such a problem may be identified by comparing the total time for identifying the required data to be deleted with a threshold amount of time, which may be user-selected. If no performance problems are identified, then the corresponding entry in data structure 500 will be null.

Returning to FIG. 3, in conjunction with FIGS. 1-2 and 4-5, in step 305, a determination is made by storage forecaster 108 as to whether the performance of database management system 107 will be improved by adding database object(s) (e.g., index) to database management system 107. In one embodiment, such an analysis involves identifying any performance-related problems in step 304 (e.g., taking too long to retrieve data), such as from data structure 500, and then determining if the problem is severe enough to require the addition of database objects (e.g., index) to improve performance. For example, if the problem of taking too long to retrieve data has been identified, and the time for retrieving data exceeds the required minimum amount of time, then a database object (e.g., database index) may be added to database management system 107 to improve the speed of data retrieval operations on the database table. While the database object improves the speed of data retrieval operations, it comes at the cost of storage space to maintain the index data structure.

If the performance of database management system 107 will not be improved by adding database objects, then, in step 306, database objects are not added to database management system 107.

If, however, the performance of database management system 107 will be improved by adding database objects, then, in step 307, storage forecaster 108 adds database object(s) (e.g., database index) to database management system 107.

In step 308, storage forecaster 108 monitors the impact on the storage usage of database management system 107 based on the utilization of these added database objects of database management system 107. For example, the addition of an index may result in an increase of the storage usage of 0.05% which may continue to increase as the index grows in size. Storage forecaster 108 continues to monitor the impact on the storage usage of database management system 107 by the added database objects, and as a result, the impact on the storage usage of database management system 107 is continuously updated.

In step 309, storage forecaster 108 builds the mathematical model to forecast the storage requirement of database management system 107 based on the monitored impact on the storage usage of database management system 107 by applications 109 (step 302), the categorization of applications 109 (step 303) as well as possibly the monitored impact on the storage usage of database management system 107 by the utilization of added database objects of database management system 107 (if any were added as discussed in connection with steps 305-308). In one embodiment, the mathematical model forecasts how much storage is required in databases 106 to service the current set of applications 109 connected to database management system 107. In one embodiment, the variables of the mathematical model include the average effect on the storage usage for various application types performing various storage-related operations. The average effect may correspond to the average effect on the storage usage identified by storage forecaster 108 based on monitoring the impact on the storage usage of database management system 107 by applications 109 in step 302. Furthermore, in one embodiment, the variables of the mathematical model may include the effect on the storage usage by the database objects added to database management system 107, as discussed above in connection with steps 307-308, which are constantly monitored by storage forecaster 108. Additionally, in one embodiment, the variables of the mathematical model include the categorizations of applications 109, where based on such categorization an inference can be made as to the impact on the storage requirements of database management system 107. For example, a higher share of applications 109 categorized in the group for performing a high percentage of create operations will reflect the forecast that a higher storage availability is required to ensure that there is available storage thereby preventing performance degradation, or at worst, failure of database management system 107.

In step 310, storage forecaster 108 forecasts the storage requirement of database management system 107 based on the built mathematical model. In one embodiment, storage forecaster 108 forecasts how much storage is required in databases 106 to service the current set of applications 109 connected to database management system 107 based on the built mathematical model. In one embodiment, the forecast is for a designated (e.g., user-specified) period of time. In one embodiment, the forecast may be presented in graphical, textual or tabular form including the statistics and details as to how applications 109 are categorized, the storage consumption rate, the usage at different points in time, etc. In one embodiment, the forecast includes all possible combinations of applications, categories of applications and/or added database objects. In one embodiment, in response to receiving a particular combination of applications and/or categories of applications and/or added database objects, storage forecaster 108 may automatically adjust the storage capacity to ensure there is available storage in order to prevent the risk of performance degradation, or at worst, failure of the database management system. In one embodiment, the storage forecast is provided to the database administrator (e.g., displayed to the database administrator) to use as a tool for ensuring that there is available storage.

In this manner, the technical problem of accurately predicting the storage requirements of the database management system is addressed by the present invention. As discussed above, the present invention provides a technological solution to the technical problem by building a mathematical model to forecast the storage requirements of the database management system based on the monitored impact on the storage usage by the applications, the categorizations of the applications and possibly based on the monitored impact on the storage usage by the added database objects, which were added to improve performance of the database management system.

In step 311, storage forecaster 108 self-tunes the mathematical model based on the accuracy of the forecasted storage requirement against an actual storage usage. Based on the accuracy of the forecast prediction, the mathematical model will be self-tuned to improve the accuracy of the prediction. For example, the determined average effect on the storage usage by particular operations performed by particular types of applications may be adjusted to more accurately reflect the actual storage usage.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for forecasting a storage requirement of a database management system, the method comprising:
monitoring storage-related operations of applications connected to said database management system;
monitoring an impact on storage usage of said database management system by said monitored storage-related operations of said applications;
categorizing said applications into groups of applications based on said monitored storage-related operations, wherein each group of applications comprises one or more applications exhibiting similar monitored storage-related operations within a threshold degree of variance;
building, by a processor, a mathematical model to forecast said storage requirement of said database management system based on said monitored impact on storage usage of said database management system by said monitored storage-related operations of said applications and based on said categorization of said applications; and
forecasting, by said processor, said storage requirement of said database management system based on said mathematical model.

2. The method as recited in claim 1 further comprising:
self-tuning said mathematical model based on accuracy of said forecasted storage requirement against an actual storage usage.

3. The method as recited in claim 1 further comprising:
monitoring performance behavior of queries on database objects of said database management system.

4. The method as recited in claim 3 further comprising:
adding one or more objects to said database management system in response to determining said one or more objects will improve performance of said database management system.

5. The method as recited in claim 4 further comprising:
monitoring an impact on storage usage of said database management system based on utilization of said added one or more objects of said database management system.

6. The method as recited in claim 5 further comprising:
building said mathematical model to forecast said storage requirement of said database management system based on said monitored impact on storage usage of said database management system by said monitored storage-related operations of said applications, said categorization of said applications and said monitored impact on storage usage of said database management system by said utilization of said added one or more objects of said database management system.

7. The method as recited in claim 4, wherein said objects comprise an index.

8. A computer program product for forecasting a storage requirement of a database management system, the computer program product comprising a computer readable storage medium having program code embodied therewith, the program code comprising the programming instructions for:
monitoring storage-related operations of applications connected to said database management system;
monitoring an impact on storage usage of said database management system by said monitored storage-related operations of said applications;
categorizing said applications into groups of applications based on said monitored storage-related operations, wherein each group of applications comprises one or more applications exhibiting similar monitored storage-related operations within a threshold degree of variance;
building a mathematical model to forecast said storage requirement of said database management system based on said monitored impact on storage usage of said database management system by said monitored storage-related operations of said applications and based on said categorization of said applications; and
forecasting said storage requirement of said database management system based on said mathematical model.

9. The computer program product as recited in claim 8, wherein the program code further comprises the programming instructions for:
self-tuning said mathematical model based on accuracy of said forecasted storage requirement against an actual storage usage.

10. The computer program product as recited in claim 8, wherein the program code further comprises the programming instructions for:
monitoring performance behavior of queries on database objects of said database management system.

11. The computer program product as recited in claim 10, wherein the program code further comprises the programming instructions for:
adding one or more objects to said database management system in response to determining said one or more objects will improve performance of said database management system.

12. The computer program product as recited in claim 11, wherein the program code further comprises the programming instructions for:
 monitoring an impact on storage usage of said database management system based on utilization of said added one or more objects of said database management system.

13. The computer program product as recited in claim 12, wherein the program code further comprises the programming instructions for:
 building said mathematical model to forecast said storage requirement of said database management system based on said monitored impact on storage usage of said database management system by said monitored storage-related operations of said applications, said categorization of said applications and said monitored impact on storage usage of said database management system by said utilization of said added one or more objects of said database management system.

14. The computer program product as recited in claim 11, wherein said objects comprise an index.

15. A system, comprising:
 a memory unit for storing a computer program for forecasting a storage requirement of a database management system; and
 a processor coupled to the memory unit, wherein the processor is configured to execute the program instructions of the computer program comprising:
  monitoring storage-related operations of applications connected to said database management system;
  monitoring an impact on storage usage of said database management system by said monitored storage-related operations of said applications;
  categorizing said applications into groups of applications based on said monitored storage-related operations, wherein each group of applications comprises one or more applications exhibiting similar monitored storage-related operations within a threshold degree of variance;
  building a mathematical model to forecast said storage requirement of said database management system based on said monitored impact on storage usage of said database management system by said monitored storage-related operations of said applications and based on said categorization of said applications; and
  forecasting said storage requirement of said database management system based on said mathematical model.

16. The system as recited in claim 15, wherein the program instructions of the computer program further comprise:
 self-tuning said mathematical model based on accuracy of said forecasted storage requirement against an actual storage usage.

17. The system as recited in claim 15, wherein the program instructions of the computer program further comprise:
 monitoring performance behavior of queries on database objects of said database management system.

18. The system as recited in claim 17, wherein the program instructions of the computer program further comprise:
 adding one or more objects to said database management system in response to determining said one or more objects will improve performance of said database management system.

19. The system as recited in claim 18, wherein the program instructions of the computer program further comprise:
 monitoring an impact on storage usage of said database management system based on utilization of said added one or more objects of said database management system.

20. The system as recited in claim 19, wherein the program instructions of the computer program further comprise:
 building said mathematical model to forecast said storage requirement of said database management system based on said monitored impact on storage usage of said database management system by said monitored storage-related operations of said applications, said categorization of said applications and said monitored impact on storage usage of said database management system by said utilization of said added one or more objects of said database management system.

* * * * *